(12) United States Patent
Weiss et al.

(10) Patent No.: US 10,447,838 B2
(45) Date of Patent: Oct. 15, 2019

(54) TELEPHONE FRAUD MANAGEMENT SYSTEM AND METHOD

(71) Applicant: WaveMarket, Inc., Emeryville, CA (US)

(72) Inventors: Andrew Weiss, San Ramon, CA (US); Scott Hotes, Berkeley, CA (US)

(73) Assignee: Location Labs, Inc., Emeryville, CA (US)

( * ) Notice: Subject to any disclaimer, the term of this patent is extended or adjusted under 35 U.S.C. 154(b) by 0 days.

(21) Appl. No.: 14/244,225

(22) Filed: Apr. 3, 2014

(65) Prior Publication Data
US 2015/0288791 A1 Oct. 8, 2015

(51) Int. Cl.
| | |
|---|---|
| *H04M 1/663* | (2006.01) |
| *H04M 3/436* | (2006.01) |
| *H04M 3/42* | (2006.01) |
| *H04W 12/12* | (2009.01) |
| *H04W 4/16* | (2009.01) |
| *H04L 29/06* | (2006.01) |
| *H04W 12/00* | (2009.01) |

(52) U.S. Cl.
CPC ....... *H04M 1/663* (2013.01); *H04M 3/42068* (2013.01); *H04M 3/436* (2013.01); *H04W 12/12* (2013.01); *H04L 63/101* (2013.01); *H04M 2201/40* (2013.01); *H04M 2203/6027* (2013.01); *H04W 4/16* (2013.01); *H04W 12/00504* (2019.01); *H04W 12/00514* (2019.01)

(58) Field of Classification Search
CPC ......... H04M 15/47; H04M 2215/0148; H04M 3/436; H04M 1/57; H04M 1/663; H04M 3/2281; H04M 3/42059; H04M 2203/6027

USPC .......................................................... 379/189
See application file for complete search history.

(56) References Cited

U.S. PATENT DOCUMENTS

| | | | |
|---|---|---|---|
| 5,828,845 A | * | 10/1998 | Jagadish ............... H04M 3/493 348/E7.075 |
| 6,529,724 B1 | | 3/2003 | Khazaka et al. |
| 6,731,746 B1 | | 5/2004 | Usami |
| 7,106,843 B1 | | 9/2006 | Gainsboro et al. |
| 7,272,633 B2 | | 9/2007 | Malik et al. |
| 7,313,383 B2 | | 12/2007 | Fujii |
| 7,672,845 B2 | * | 3/2010 | Beranek ................... 379/265.09 |
| 7,849,502 B1 | | 12/2010 | Bioch et al. |
| 7,869,792 B1 | | 1/2011 | Zhou et al. |
| 7,899,704 B1 | | 3/2011 | Thompson |

(Continued)

FOREIGN PATENT DOCUMENTS

JP       2011135328 A   *   7/2011

*Primary Examiner* — Ahmad F. Matar
*Assistant Examiner* — Jirapon Intavong
(74) *Attorney, Agent, or Firm* — Dovas Law, P.C.

(57) ABSTRACT

A process-based, automated phone fraud management system that operates over a communication network to protect a user from attempted fraud by a fraud agent is disclosed. Local application software interacts with server software to provide alerts for a protected user based on phone numbers known to be, assumed to be, or found to be associated with fraud agents. The server keeps lists of phone numbers, and searches those lists to classify phone numbers. Phone calls to or from numbers associated with a fraud agent are interrupted. Questionable calls are converted to text and the text is then searched to identify words and phrases commonly associated with phone fraud.

26 Claims, 5 Drawing Sheets

(56) References Cited

U.S. PATENT DOCUMENTS

| | | |
|---|---|---|
| 7,925,690 B2 | 4/2011 | Smith et al. |
| 7,996,005 B2 | 8/2011 | Lotter et al. |
| 8,185,953 B2 | 5/2012 | Rothstein et al. |
| 8,249,627 B2 | 8/2012 | Olincy et al. |
| 8,279,808 B2 | 10/2012 | Sing et al. |
| 8,315,597 B2 | 11/2012 | Olincy et al. |
| 8,369,838 B2 | 2/2013 | Mallavarapu et al. |
| 8,503,994 B1 | 8/2013 | Sanjeev |
| 8,521,132 B2 * | 8/2013 | Washio ................ H04M 3/36 455/410 |
| 8,661,123 B2 | 2/2014 | Nishiyama |
| 8,768,286 B2 | 7/2014 | Naboulsi |
| 8,774,785 B1 * | 7/2014 | Kirchhoff ............ H04W 4/12 379/210.02 |
| 2002/0049806 A1 | 4/2002 | Gatz et al. |
| 2003/0012346 A1 * | 1/2003 | Langhart ............ H04M 3/42221 379/67.1 |
| 2003/0126267 A1 | 7/2003 | Gutta et al. |
| 2003/0216138 A1 | 11/2003 | Higuchi et al. |
| 2004/0111479 A1 | 6/2004 | Borden et al. |
| 2005/0096009 A1 | 5/2005 | Ackley |
| 2006/0079201 A1 * | 4/2006 | Chung ................ H04M 1/72563 455/410 |
| 2007/0030842 A1 * | 2/2007 | Borden ................ G06K 9/6215 370/352 |
| 2007/0041545 A1 | 2/2007 | Gainsboro |
| 2007/0263843 A1 | 11/2007 | Foxenland |
| 2007/0277224 A1 | 11/2007 | Osborn et al. |
| 2008/0005325 A1 | 1/2008 | Wynn et al. |
| 2008/0066020 A1 | 3/2008 | Boss et al. |
| 2008/0176585 A1 | 7/2008 | Eldering |
| 2008/0177834 A1 | 7/2008 | Gruhl |
| 2008/0270038 A1 | 10/2008 | Partovi et al. |
| 2009/0125499 A1 | 5/2009 | Cross et al. |
| 2009/0260064 A1 | 10/2009 | McDowell et al. |
| 2009/0327150 A1 | 12/2009 | Flake et al. |
| 2010/0042684 A1 | 2/2010 | Broms et al. |
| 2010/0076274 A1 | 3/2010 | Severson |
| 2010/0077444 A1 | 3/2010 | Forristal |
| 2010/0158213 A1 * | 6/2010 | Mikan ................ H04M 3/42221 379/88.14 |
| 2010/0161369 A1 | 6/2010 | Farrell et al. |
| 2010/0211694 A1 | 8/2010 | Razmov et al. |
| 2010/0246797 A1 | 9/2010 | Chavez et al. |
| 2010/0278320 A1 * | 11/2010 | Arsenault ............ H04L 12/66 379/88.12 |
| 2010/0330972 A1 | 12/2010 | Angiolillo |
| 2011/0045868 A1 | 2/2011 | Sheha et al. |
| 2011/0055546 A1 | 3/2011 | Klassen et al. |
| 2011/0117878 A1 | 5/2011 | Barash et al. |
| 2011/0125844 A1 | 5/2011 | Collier et al. |
| 2011/0208822 A1 | 8/2011 | Rathod |
| 2011/0218884 A1 | 9/2011 | Kothari et al. |
| 2011/0289161 A1 | 11/2011 | Rankin et al. |
| 2012/0015639 A1 * | 1/2012 | Trivi ................ H04M 3/436 455/415 |
| 2012/0047448 A1 | 2/2012 | Amidon et al. |
| 2012/0047560 A1 | 2/2012 | Underwood et al. |
| 2012/0083287 A1 | 4/2012 | Casto et al. |
| 2012/0102008 A1 | 4/2012 | Kaariainen et al. |
| 2012/0149352 A1 | 6/2012 | Backholm et al. |
| 2012/0151045 A1 | 6/2012 | Anakata et al. |
| 2012/0151046 A1 | 6/2012 | Weiss et al. |
| 2012/0151047 A1 | 6/2012 | Hodges et al. |
| 2012/0180135 A1 | 7/2012 | Hodges et al. |
| 2012/0226704 A1 | 9/2012 | Boland et al. |
| 2012/0233256 A1 | 9/2012 | Shaham et al. |
| 2012/0315880 A1 | 12/2012 | Peltrow et al. |
| 2013/0143521 A1 | 6/2013 | Hernandez et al. |
| 2013/0143528 A1 | 6/2013 | Randazzo et al. |
| 2013/0217331 A1 | 8/2013 | Manente |
| 2013/0282889 A1 | 10/2013 | Tito |
| 2013/0303106 A1 | 11/2013 | Martin |
| 2015/0163664 A1 | 6/2015 | Martin |

* cited by examiner

TELEPHONE FRAUD MANAGEMENT SYSTEM AND METHOD

BACKGROUND

Communication devices enabled with central processing units (CPUs) such as smartphones have become ubiquitous communication platforms well suited to the needs of active people. As more business and social activities migrate to the high speed virtual digital world, it becomes ever more difficult for users to keep up even with the speed and power of modern mobile communication devices. For example, a user may establish and maintain business and social relationships via email, texting, digital voice communications, digital data transmissions, internet access and searching, and application support such as scheduling and calendaring.

While CPU-enabled communication devices and their supporting structures and applications have proven highly useful, their speed and power as well as their wide range of uses in business and social relationships by busy people have proven detrimental in that they create a rich environment for phone fraud.

Fraud perpetrated via phone is a serious and growing problem. Financial scams promulgated over the phone deceive victims into giving out credit card numbers, bank account identification, and other personal information that are then exploited by the caller. Senior citizens are particularly vulnerable to financial scams promulgated over the phone. One study estimated that there are at least 5 million cases of financial phone fraud in the United States each year. Of those, law enforcement or government officials learn about only 1 in 25 cases. Although such fraud is widely believed to be under-reported, a 2009 study by MetLife's Mature Market Institute estimates that seniors lose approximately $2.6 billion per year due to financial abuse. In view of the foregoing, a phone fraud management system would be beneficial.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

Described is a processor-based automated phone fraud management system that makes use of communication networks. A server based computer interacts with local communication devices to protect users by providing alerts based on the probability of a call being associated with phone fraud. The phone fraud management system enables a user to enter a "white list" of known good telephone numbers while the fraud management system maintains a "blacklist" of known or assumed telephone numbers that are associated with fraud agents. The phone fraud management system can also keep a "watch list" of telephone numbers associated with possible fraud agents. The phone fraud system monitors calls to identify fraud or potential fraud and adds telephone numbers suspected of being associated with fraudulent activity to the watch list and numbers assumed to be associated with a fraudulent activity to the blacklist. Alerts are provided to users and a user can "tag" an ongoing call as being associated with a fraud agent. The phone management system then tracks tagged telephone numbers and attempts to verify fraud based on other communications associated with that telephone number. The phone management system can be implemented to automatically disconnect fraudulent calls.

A process of managing telephone fraud includes detecting a phone communication on a communication device, the phone communication corresponding to a particular phone number; using a processor to compare the particular phone number to at least one list of phone numbers; and then providing an alert to a user through the communication device based on the comparison of the phone number to the at least one list.

Another method includes detecting a phone communication on a communication device, the phone communication corresponding to a particular phone number; analyzing the phone communication to determine a suspected fraudulent intent; and providing a notification to the user through the communication device based on the suspected fraudulent intent. The method can also include analyzing audio or a text transcription of the phone communication to determine the suspected fraudulent intent, and providing a notification to the user through the communication device based on the suspected fraudulent intent during the phone communication, and the analyzing can include determining the existence of a particular word, particular phrase, or a particular topic in the phone communication. The method can further include disconnecting or interrupting the phone communication responsive to determining that the phone communication corresponds to the suspected fraudulent intent and re-enabling the phone communication responsive to a user input via the communication device.

Another method includes interrupting a detected phone communication on a communication device corresponding to a particular phone number a first time based on a comparison of the phone number to a list of phone numbers, re-enabling the phone communication a first time responsive to a user input via the communication device, interrupting the phone communication a second time responsive to determining that audio in the communication corresponds to a suspected fraudulent intent, and re-enabling the phone communication a second time responsive to a user input via the communication device. The re-enabling the phone communication at the first time or the second time can be responsive to user input of a code via the communication device.

Yet another method includes receiving by a computing system an indication of a particular phone number from a plurality of communication devices, the phone number corresponding to voice communications flagged for fraudulent intent by users of the communication devices; determining using the computing system that the indications of the particular phone number exceed a particular threshold; then determining that the particular phone number corresponds to a particular voice communication in progress on a particular communication device; and providing an indication of an alert to the user of the communication device during the particular voice communication while the communication is in progress.

Still another method includes converting audio of the phone communication to text; comparing the text to a list of particular words or phrases; determining that the text corresponds to at least one word or phrase from the list of particular words or phrases; and providing an indication to a user through the communication device based on the determining that the text corresponds to at least one word or phrase from the list of particular words or phrases. Converted text can alternatively be run through a classifier that has been trained to detect fraudulent interactions, and an indication can be provided to a user based on a detected fraudulent interaction.

A network enabled system is provided including a communication device corresponding to a first user. The communication device is configured for detecting a phone communication on the communication device and transmitting via a network data corresponding to the phone communication during the phone communication. Further, a computing system is provided configured for receiving the data corresponding to the phone communication during the phone communication. The computing system uses a processor to analyze the data corresponding to the phone communication to determine a potential fraud, and provides an alert to a user through the communication device based on the analysis of the data corresponding to the phone communication.

BRIEF DESCRIPTION OF THE DRAWING(S)

A more detailed understanding may be had from the following description, given by way of example and from the accompanying drawings. The Figures in the drawings and the detailed description are examples and are not to be considered limiting. Like reference numerals in the Figures indicate like elements wherein:

FIG. 1 presents an operational diagram of a network 8 including a fraud management system 200;

DETAILED DESCRIPTION OF ILLUSTRATIVE EMBODIMENT(S)

Although features and elements are described above in particular combinations, one of ordinary skill in the art will appreciate that each feature or element can be used alone or in any combination with the other features and elements. Processes described herein may be stored on a non-transitory computer readable medium and implemented in a computer program, software, or firmware for execution by a computer or processor.

The terms "a" and "an" as used herein do not denote a limitation of quantity, but rather denote the presence of at least one of the referenced items. Any directional signal such as top, bottom, left, right, upper and lower are taken with reference to the orientation in the various figures.

As referred to herein, a "computing device" should be broadly construed. A computing device includes any processor-based device having memory suitable for receiving code from non-transitory computer readable media for implementing the subsequently disclosed fraud management system 200. Such devices may be a mobile device such as a smartphone, a cell phone, a pager, a personal digital assistant (PDA), a mobile computer with a smartphone client, a tablet computer or the like. A computing device can also be a conventional computer such as a laptop computer or a desktop computer.

The fraud management system 200 makes use of one or more telecommunications systems. Telecommunications may be performed using either a wired communication device such as a landline telephone or a wireless communication device. Wireless communication devices include devices such as a smartphone which are capable of sending and receiving voice communications using any protocol such as Internet Protocol or wireless application protocol ("WAP").

Figure 1:
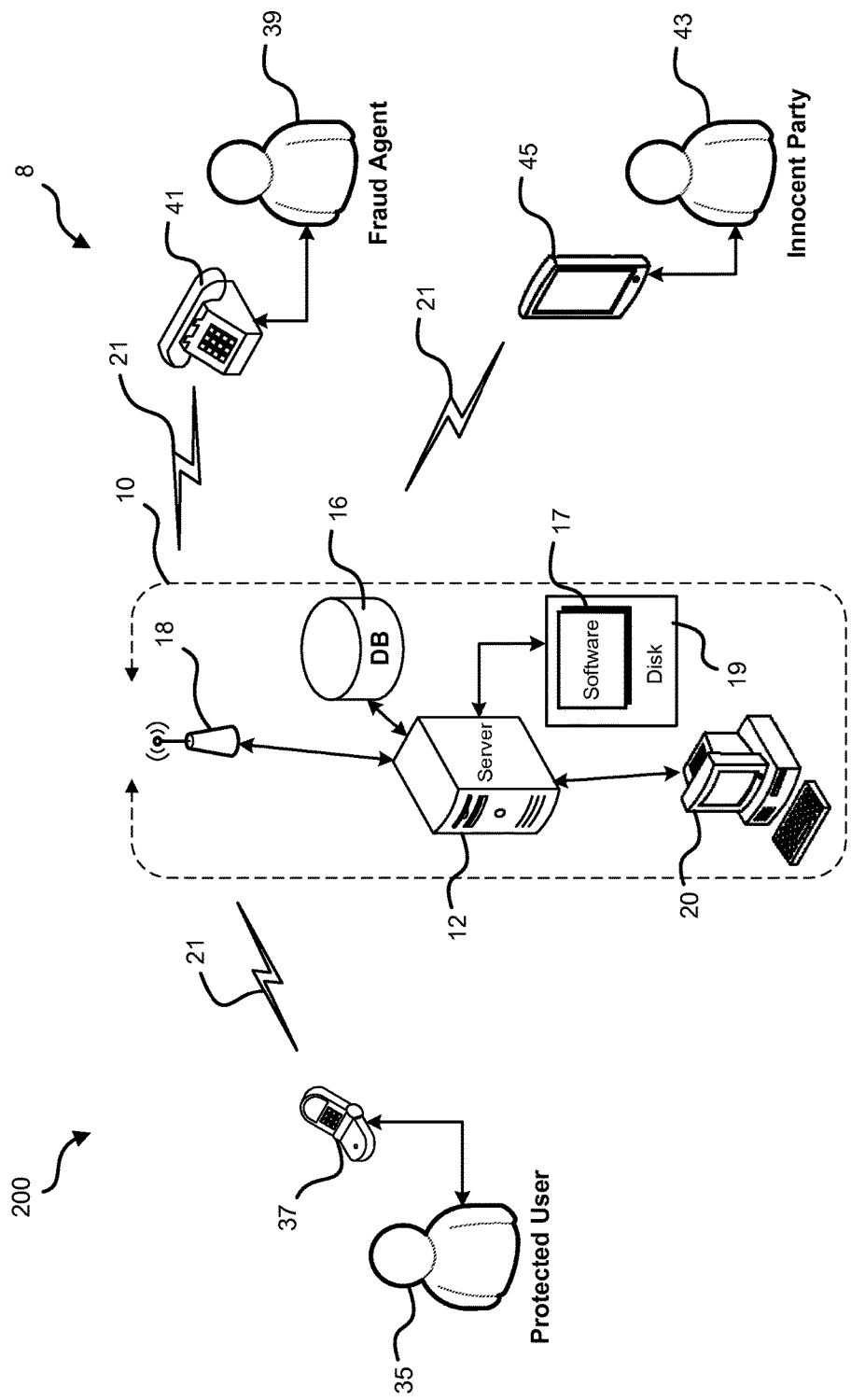

FIG. 1 illustrates a prototypical network 8 implementing the fraud management system 200. The network 8 is a computerized system that operates in accord with non-transitory computer programmable code that supports telecommunications between different parties as described subsequently.

The network 8 includes a sub-network 10 having a processor-controlled server 12 with access to a database 16 and to a communication system 18. The server 12 runs in accord with internal software 17, which causes the server 12 to implement its part of the fraud management system 200. Before being loaded onto the server 12 the software 17 is stored on a non-transitory media such as a data disk 19. The server 12 is also in communication with a local computer 20 with an optional display which may act as a data terminal or as an auxiliary computing device. The server 12 and its constituent elements are preferably implemented on one or more network connectable processor-enabled computing systems via hardware components and software components. The server 12 need not be implemented on a single system at a single location, but can be decentralized for example in a peer-to-peer configuration.

The communication system 18 supports bi-directional calls, text messages and data transfers. While FIG. 1 includes arrows 21 that suggest wireless communications, the use of arrows 21 is merely for convenience. Each arrow 21 should be understood as being any subset of the set of communication venues such as wireless cellular network, a hard-wired Ethernet, telephone, microwave, optical or any other technique that enables communication between the various devices (described below) and the server 12. The communication system 18 should be understood as including a network of cellular towers, internet links, routers, phone lines, microwave towers, and/or other communication facilities as needed to implement its purpose.

Figure 4:
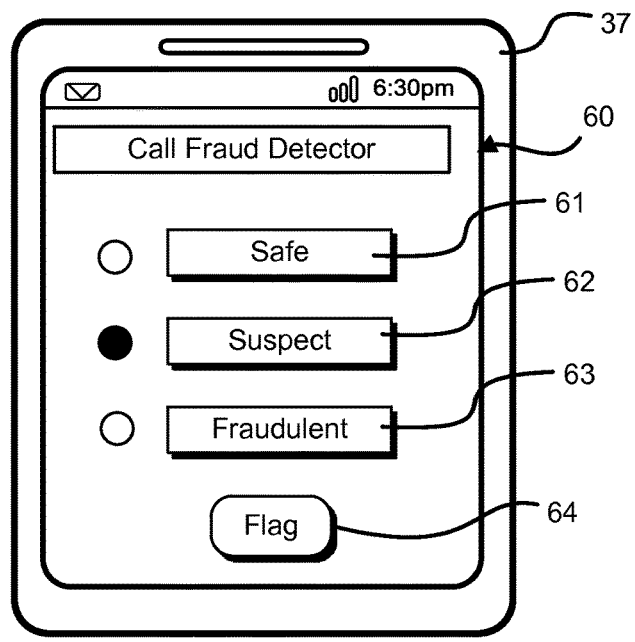
FIG. 4 is a screen shot of the communication device 37 showing a warning alert.
Figure 5:
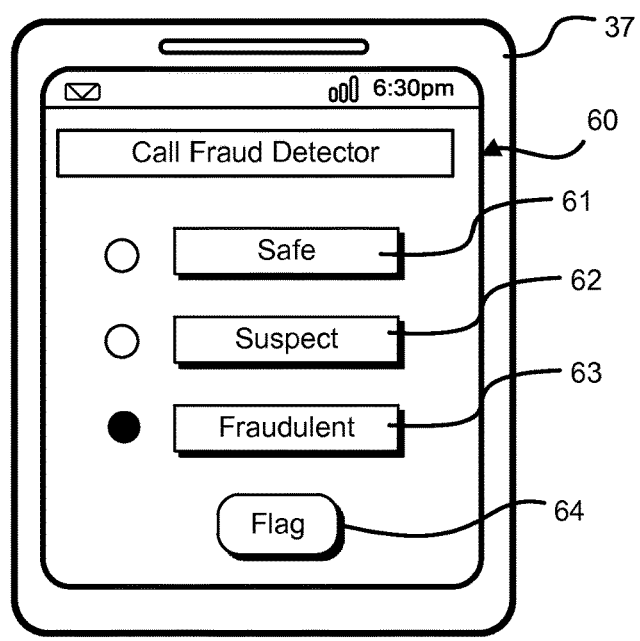
FIG. 5 is a screen shot of the communication device 37 showing a fraud alert.

One aspect of the network 8 is its user interface capabilities. User interfaces may include input devices to manipulate associated processors and output devices for enabling a processor to present information. Examples include graphical user interfaces (GUI), sound outputs, flashing lights, keyboards, touch screens, mice, pads, voice recognition systems, and printers. FIGS. 4 and 5 present illustrative graphical user interfaces 60.

As noted, the communication system 18 supports data transfers and voice communications for users of the fraud management system 200. Still referring to FIG. 1 such users include a protected user 35 that uses a computer enabled communication device 37 such as a cell phone (e.g., smart phone), tablet computer, or laptop computer, to communicate over the communication system 18. Others involved in the fraud management system 200 include a fraud agent 39 that uses a landline phone 41 for communications and an innocent party 43 that uses a phone enabled tablet computer 45 for communications. The fraud agent 39 is attempting phone fraud on the protected user 35 while the innocent party 43 is not. The communication device 37 and the tablet computer 45 should be understood as operating under the control of internal processors that run in accord with software. The landline phone 41 is not necessarily under the control of software.

The database 16 and possibly the data disk 19 include one or more lists of telephone numbers associated with or suspected of being used for attempting or having committed telephone fraud. Table 1 illustrates such lists. Lists may be compiled from telephone company records or police department records, uploaded by the protected user 35, or learned as discussed subsequently. The lists can then be compared by the processor of the server 12 (or of the communication device 37) with telephone numbers of calls to identify the existence of a potential fraud agent 39. The server 12 then alerts the protected user 35 of potential fraud, optionally breaks the telecommunications by ending or interrupting the call, monitors the communications to identify potential fraud, or takes other actions to protect the protected user 35. A call interruption can be implemented by the fraud management application 148 for example by triggering an audio output on the device such as music to supplant audio from the call.

The fraud management system 200 also assists the protected user 35 to assess the nature of phone interactions that occur over the communication device 37 and to constructively deal with phone interactions that may have fraudulent intent.

Figure 2:
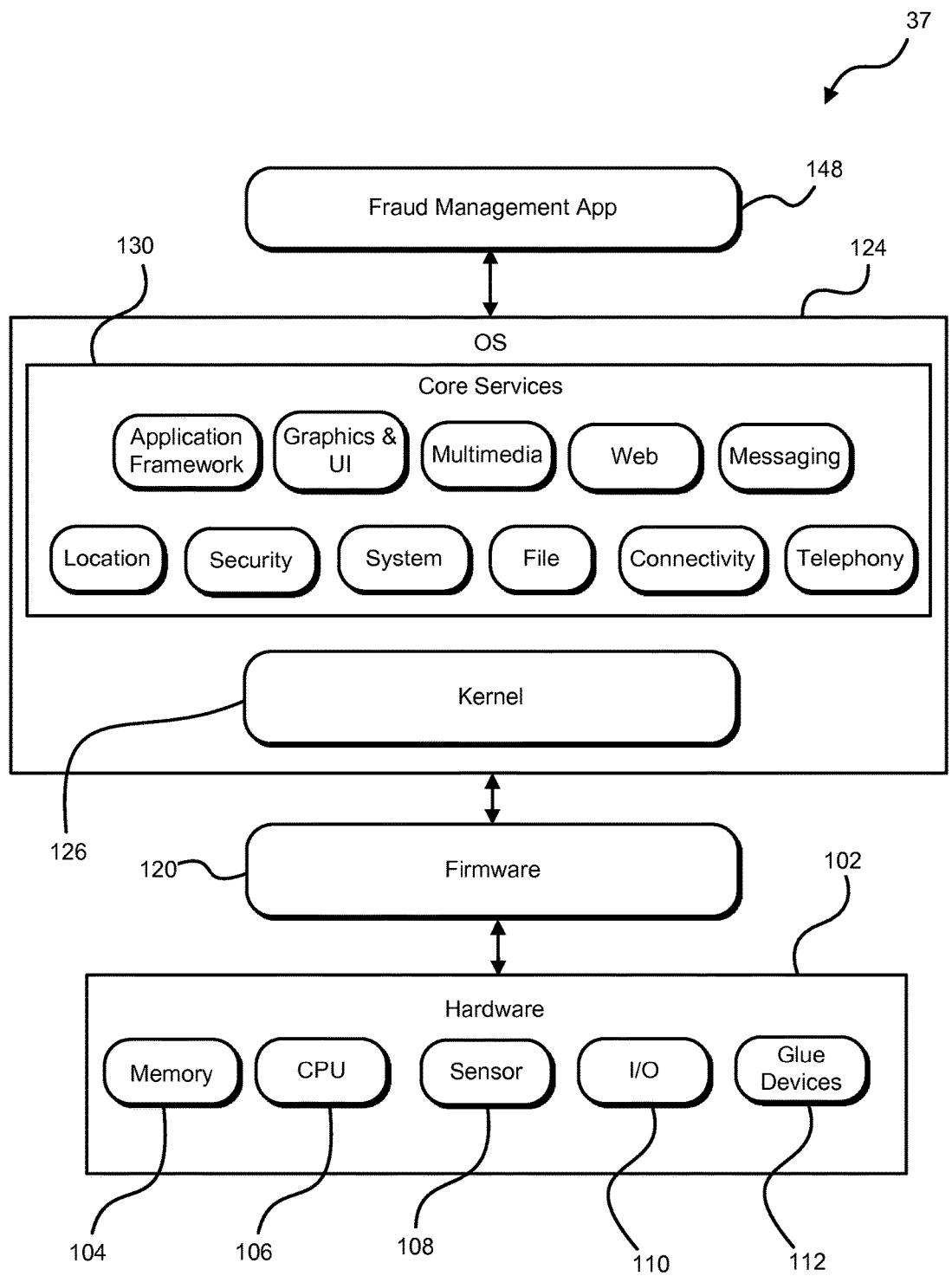
FIG. 2 is a hierarchical view of a communication device 37 shown in FIG. 1.

FIG. 2 illustrates an abstract hierarchical functional operation of a communication device 37 from basic hardware devices to the top level family plan widget 118. While the communication device 37 is illustrated similar processor based systems exist in other devices. At the lowest abstraction level is a collection of basic semiconductor hardware 102 devices, typically integrated circuits. Such semiconductor hardware 202 typically includes memory 104, a central processor unit ("CPU") 106, numerous sensors and their support electronics 108, input/output ("I/O") 110 device support (specifically including display screens and drivers, audio drivers and outputs, RF transceivers, etc.), and glue devices 112 as required to change voltage levels or signal levels and to perform other interfacing as required for proper hardware 102 functionally. The displays shown in FIGS. 5 and 6 should be understood as being produced by the input/output 110.

Still referring to FIG. 2, the next level of abstract hierarchical progression is firmware 120, if required. Firmware 120 is useful for enabling upgrading of the communication device 37 by storing in non-volatile memory settings, such as model numbers, version numbers, and controlling bits which establish a set of functions and limit or restrict the communication device's capabilities.

Moving up the abstract hierarchical progression from the firmware 120 is an operating system 124. The operating system 124 provides a set of core software programs that manage the semiconductor hardware 102 and firmware 120 and implements common services required for application software. The operating system 124 includes a low-level "kernel" routine 126 that handles basic software integration to the firmware 120 and hardware 102 to implement underlying functions. In practice the kernel 126 is used across a family of communication devices. Over the kernel 126 is a set of core services 130 that while still basic may change from time to time or from family device to family device. The core services 130 are software functions that support the on-board services of the communication device 37. The core services may include software routines that support and enable the application framework, graphics, web support, messaging, location finding (GPS), system security, connectivity, telephony and a file system.

Overlaying the operating system 124 is a fraud management application 148. The fraud management application 148 is the part of the overall fraud management system 200 that resides on the communication device 37. The fraud management application 148 can be downloaded from the server 12 or from a third party provider. The operation of the fraud management application 148 depends on the existence and operation of the overall fraud management system 200.

Figure 3A:
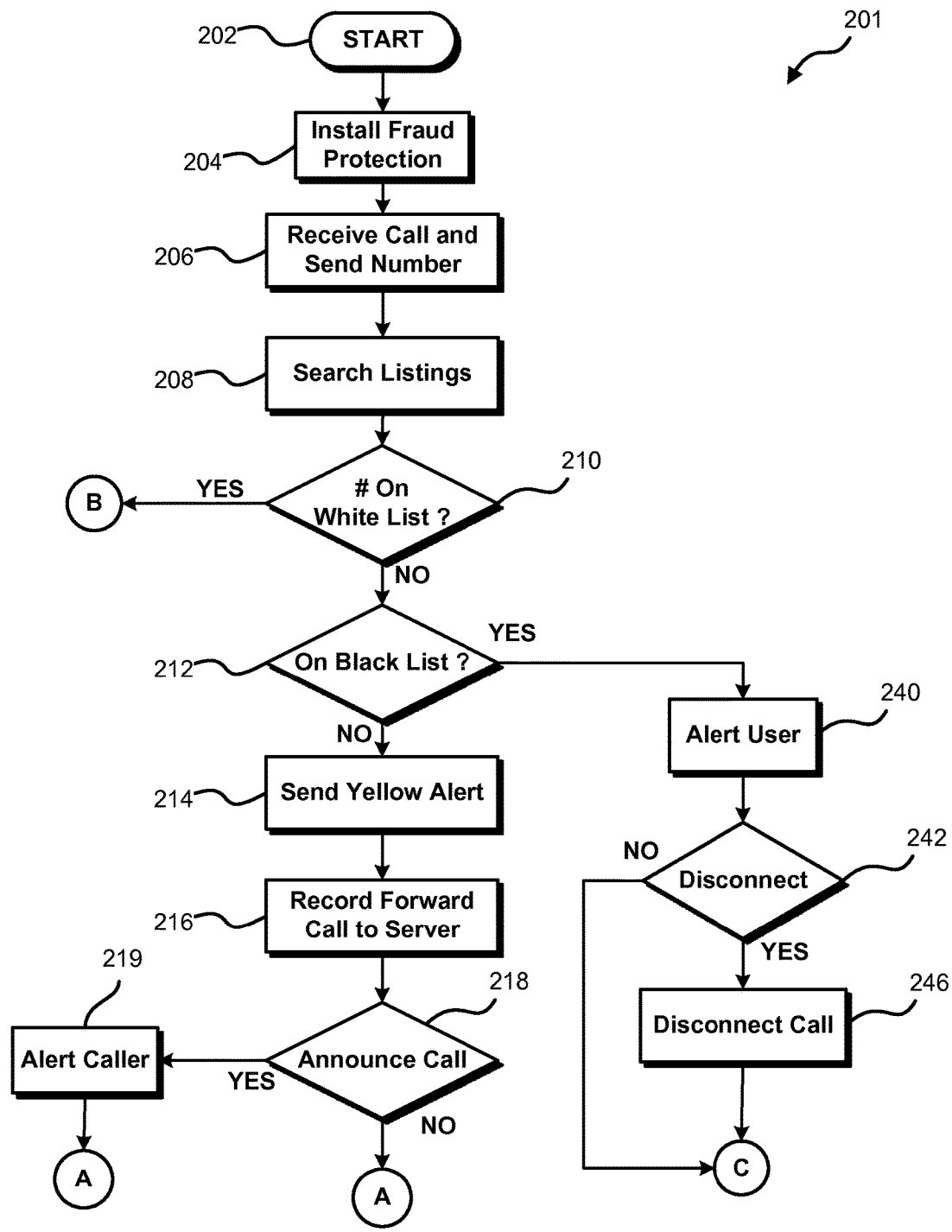
FIG. 3A is a flow diagram showing a process enabled by the fraud management system 200.

Turning now to FIG. 3A, the fraud management system 200 enables a process 201 which starts, step 202, and proceeds with the installation of software enabling the fraud management system 200, step 204. The fraud management system 200 is implemented in non-transitory software that is loaded as the fraud management application 148 on the communication device 37 and as the internal software 17 that runs on the server 12. Following software installation the protected user 35 waits until a call is received or initiated. The associated phone number of the call is then sent to the server, step 206. Step 206 can alternatively correspond to a text message or other non-phone communication.

The server 12 maintains both a "white list" of phone numbers that are considered safe by the protected user 35 and a "black list" of phone numbers that are known to be or are assumed to be associated with a fraud agent 39. The white list is created by the protected user 35 and is therefore specific to that user, and the black list is typically continually being revised either from new information received from a third party or as learned by the fraud management system 200 as discussed subsequently. In addition, the server 12 maintains a watch list of numbers that may be associated with a fraud agent 39. Table 1 below provides an example list.

TABLE 1

| White List Phone Nos. | Black List Phone Nos. | Watch List Phone Nos. |
| --- | --- | --- |
| 716 555 2389 | 301 555 2389 | 215 555 1235 |
| 415 555 8386 | 212 555 4237 | 732 555 7654 |
| 311 555 0068 | 619 555 5928 | 610 555 2468 |
| 660 555 5790 | 816 555 5790 | 267 555 0964 |

FIGS. 4 and 5 show exemplary interfaces in which the fraud management application 148 enables an interface 60 with the heading "Call Fraud Detector". The interface 60 provides three indicators 61, 62, 63 to be displayed when a phone call (or alternatively, text message or other communication) is initiated between the communication device 37 and another device. A "safe" indicator 61 corresponds to a determination that a current communication is unlikely to involve a fraud. A "suspect" indicator 62 corresponds to a determination that a current communication may possibly involve a fraud (e.g., a 40%-60% likelihood of fraud). A "fraudulent" indicator 63 corresponds to a determination that a current communication is likely to involve fraud (e.g., a 60%-100% likelihood of fraud). In FIG. 4 the suspect indicator 62 is positioned next to a shaded bullet indicating that a current communication may possibly involve a fraud. Further, the suspect indicator 62 blinks yellow when a communication may possibly involve a fraud. A shaded bullet is positioned next to the safe indicator 61, and the safe indicator 61 blinks green when the communication is unlikely to involve a fraud. In FIG. 5, a shaded bullet is positioned next to the fraudulent indicator 63, and the fraudulent indicator 63 blinks red indicating a current communication is likely to involve a fraud.

Following receipt of the phone number the server 12 searches its listings, step 208. If the incoming phone number is not found on the white list, step 210, and is not found on the black list, step 212, the server 12 sends the communication device 37 a yellow alert which causes the communication device 37 to inform the protected user 35 that the status of the incoming phone number is not known, step 214. For example, the communication device 37 might flash a yellow warning sign on the screen or a tone may be created (reference FIG. 4).

Upon receipt of the yellow alert, the communication device 37 records and forwards the phone call to the server 12, step 216. It is determined in step 218 whether to alert the caller that the call is being recorded, for example in view of state law requiring that recording of a phone call must be announced. If so, the communication device 37 provides a notification to the caller that the call is being recorded, step 219, for example including an audio announcement audible to the caller delivered substantially simultaneously with the commencement of recording. The recording is transmitted to the server 12 continuously in real-time or at particular time intervals while the call is in progress.

The server 12 stores the audio recording with a timestamp corresponding to the call initiation time (e.g., Apr. 5, 2015, 6:43 pm) and duration (e.g., 6 minutes, 23 seconds) step 220. The server converts the audio to text, step 222, which is also stored. The text is then analyzed, step 224, for content indicative of a fraudulent interaction. The server 12 can analyze to identify words or phrases, for example "credit", "bank", "loan", "mortgage", "social security", "win/won", "check", "prize", "sweepstakes", "lottery", "invest", "investment", "charity", "donate", home or auto "repair", "foreclosure", and "Nigeria". Further, a trained classifier can be applied to converted text in making a determination of a fraudulent interaction. Text classification can be topic based to detect conversations around issues such as credit cards, bank loans, charity, investments or other monetary interactions. Further, a classifier trained to detect voice tones or other characteristics of the incoming calls such as area codes can be implemented to determine indications of a fraudulent communication. Stored audio recordings and text can be used in training or retraining of classifiers and can be rendered available to a user, for example for use in legal proceedings against fraudulent parties.

Following step 224, the server 12 classifies the call (or alternatively text message or other communication) as being fraudulent (or having a high probability of being fraudulent) or not fraudulent, step 226. If the determination is that the call is fraudulent a decision is made, step 228, to alert the user, step 250, and to determine if the call should be disconnected, step 252, and to disconnect the call if so determined, step 254, after which the call is logged, step 234. If the determination is that the call is not fraudulent a decision is made, step 228, to allow the protected user 35 an opportunity to override the fraud management system 200 and to flag the call as fraudulent, step 230. This can be accomplished by the protected user 35 pressing a button on the communication device 37, which then sends the flag to the server 12; reference the flag entry screen button 64 in FIGS. 4 and 5. If the protected user 35 does not flag the call the fraud management system 200 stops, step 232, and awaits the next call.

However, if the protected user 35 does flag the call at step 230 the fraud management system 200 logs the call as possibly being fraudulent, step 234. The phone number of the call (or alternatively text message or other communication) is then stored on the server 12 in the watch list as a number that may be associated with a fraud agent 39. Converted text of the call (or text of message or other communication) is also stored, which can be used for classifier training. As more users flag that phone number as fraudulent, the likelihood of the phone number being associated with a fraud agent 39 increases. Once the likelihood exceeds a threshold, the flagged phone number is transferred to the black list as a phone number known to be associated with a fraud agent 39. By requiring a plurality of flags from different users, the server 12 prevents a phone number from being blacklisted based on a malicious intent or erroneous flagging of the protected user 35.

After the call is logged in the fraud management system 200 at step 234, the fraud management system optionally sends a notification of possibly fraudulent activity to a third party, step 236. Examples of the third party include a relative of the protected user 35, a fraud hotline, the police, or a designated caretaker of the protected user 35. The fraud management system 200 then stops, step 232, and awaits the next call.

Figure 3B:
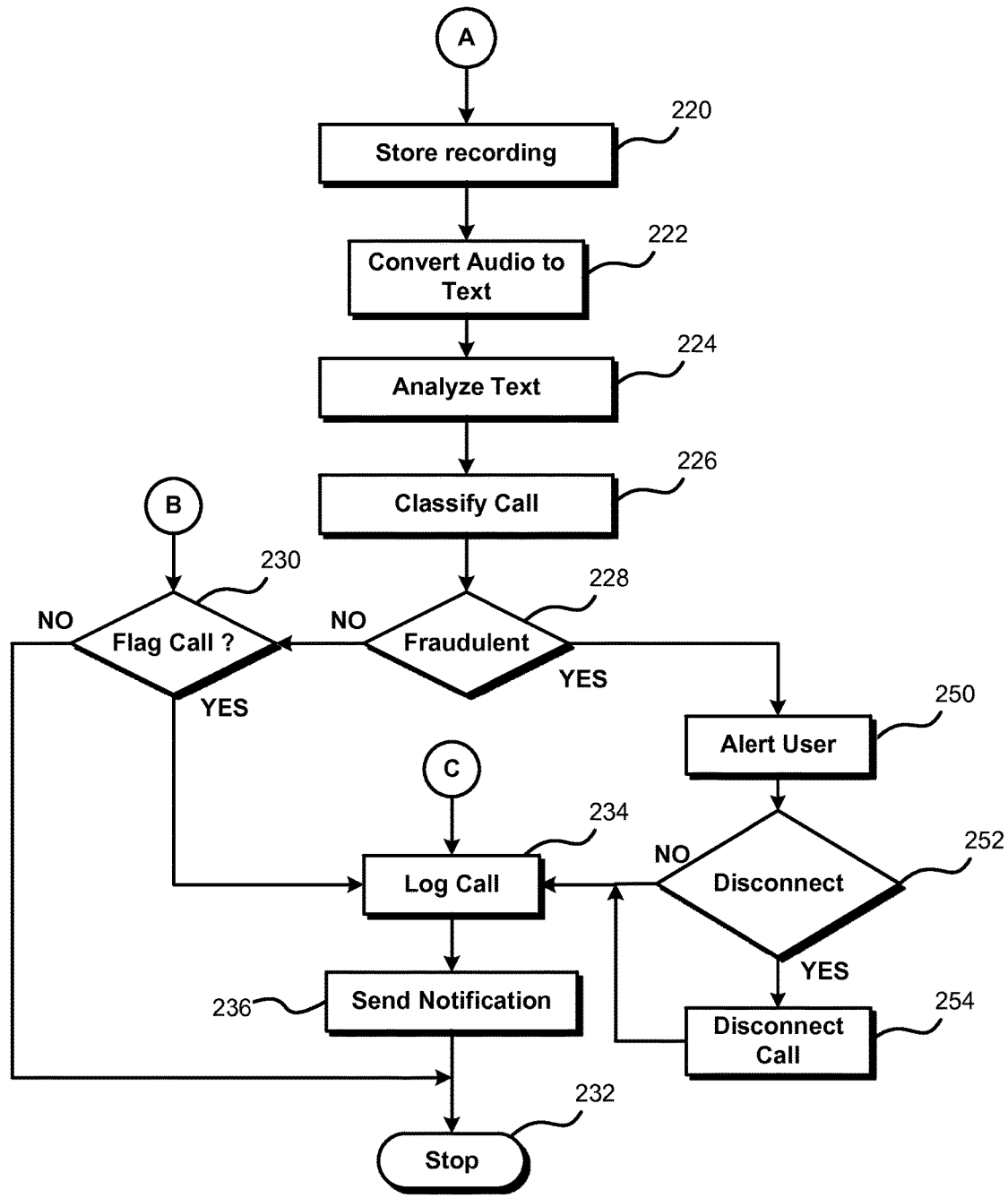
FIG. 3B is a flow diagram of a process enabled by the fraud management system 200.

Referring now to both FIG. 3A and FIG. 3B, if in step 210 the determination is that the call is on the white list, the fraud management system 200 jumps to step 230 to allow the protected user 35 an opportunity to flag the call. The fraud management system 200 then proceeds from step 230 as described above.

Furthermore, if in step 212 the determination is that the phone number is on the black list, the fraud management system 200 proceeds by having the server 12 issue a fraud alert to the protected user 35, step 240. This is accomplished by the server 12 sending the communication device 37 an alert which then causes the communication device 37 to flash a red warning signal (reference FIG. 5). The fraud management system 200 can be configured to automatically disconnect calls to and from blacklisted phone numbers, step 242. If so configured the phone call is disconnected, step 246. Following disconnection if it is being used, or after step 240, the fraud management system 200 proceeds to step 234 (FIG. 3B) where the call is logged as discussed previously. The fraud management system 200 then proceeds as discussed above.

Still referring to both FIGS. 3A and 3B, if in step 218 it is determined that the caller must be alerted that the call is being recorded, the caller is so alerted, step 219. The fraud management system 200 then proceeds to step 220 (FIG. 3B) and follows the process as discussed above.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method of providing an alert to a communication device user, the method comprising:
   providing an application on a first communication device enabling monitoring of phone communications on the first communication device;
   detecting via the application an incoming phone communication on the first communication device between the first communication device and a second communication device, the phone communication corresponding to a particular phone number of the second communication device;
   using a processor to compare the particular phone number to at least one list of phone numbers;
   analyzing at least one of audio of the phone communication as the phone communication is ongoing or a text transcription of the ongoing phone communication to determine a suspected fraudulent intent;

providing via the application an alert indicating a potential fraud during the phone communication as the phone communication is ongoing to a user through the first communication device based on the comparison of the particular phone number to the at least one list and based on the suspected fraudulent intent during the ongoing phone communication;

interrupting the ongoing phone communication by a process comprising disabling audio of the ongoing phone communication via the application based on the comparison of the particular phone number to the at least one list and responsive to determining that the ongoing phone communication corresponds to the suspected fraudulent intent; and re-enabling the phone communication responsive to a user input by the user via the first communication device.

2. The method of claim 1, further comprising:
determining that the particular phone number does not correspond to at least one phone number on the at least one list based on the comparison; and
providing the alert responsive to the particular phone number not corresponding to the at least one phone number on the at least one list.

3. The method of claim 1, further comprising:
determining that the particular phone number corresponds to at least one phone number on the at least one list based on the comparison; and
providing the alert responsive to the particular phone number corresponding to the at least one phone number on the at least one list.

4. The method of claim 1, further comprising
determining that the particular phone number corresponds to at least one phone number on the at least one list based on the comparison; and
interrupting the phone communication responsive to the particular phone number corresponding to the at least one phone number on the at least one list.

5. The method of claim 1, further comprising:
determining that the particular phone number corresponds to at least one phone number on the at least one list based on the comparison; and
generating a signal output to interrupt the phone communication responsive to the particular phone number corresponding to the at least one phone number on the at least one list.

6. The method of claim 1, further comprising recording the phone communication based on the comparison of the particular phone number to the at least one list.

7. The method of claim 6, further comprising outputting an audible message advising a party to the phone communication that the phone communication is being recorded.

8. The method of claim 1, further comprising:
converting the audio of the phone communication to text;
comparing the text to a list of particular words;
determining that the text corresponds to at least one word from the list of particular words; and
providing an indication to the user through the first communication device during the ongoing phone communication based on the determining that the text corresponds to the at least one word from the list of particular words.

9. The method of claim 1, further comprising:
converting the audio of the phone communication to text;
applying a classifier to the text, the classifier trained to detect the suspected fraudulent intent; and
providing an indication to the user through the first communication device during the ongoing phone communication based on the detecting that the text corresponds to the suspected fraudulent intent based on the applying of the classifier.

10. The method of claim 1, further comprising:
applying a classifier to the audio of the phone communication, the classifier trained to detect the suspected fraudulent intent; and
providing an indication to the user through the first communication device during the ongoing phone communication responsive to determining that the audio corresponds to the suspected fraudulent intent based on the applying of the classifier.

11. The method of claim 1, wherein analyzing the at least one of the audio or the text transcription comprises determining the existence of at least one of a particular word, particular phrase, or a particular topic in the phone communication.

12. The method of claim 1, further comprising:
interrupting the ongoing phone communication a first time based on the comparison of the particular phone number to the at least one list;
re-enabling the ongoing phone communication a first time responsive to a first user input via the first communication device;
interrupting the ongoing phone communication a second time responsive to determining that the audio corresponds to the suspected fraudulent intent; and
re-enabling the ongoing phone communication a second time responsive to a second user input via the first communication device.

13. The method of claim 12, wherein re-enabling the phone communication at least one of the first time or the second time is responsive to user input of a code via the first communication device.

14. The method of claim 1, further comprising:
receiving by a computing system an indication of the particular phone number through a network from the first communication device;
comparing the particular phone number corresponding to the phone communication to the at least one list of phone numbers by the computing system by the processor; and
providing an indication of the alert to the first communication device based on the comparison of the particular phone number to the at least one list.

15. A method comprising:
providing an application on a first communication device enabling monitoring of phone communications on the first communication device;
detecting via the application using a processor an incoming phone communication on the first communication device between the first communication device and a second communication device, the phone communication corresponding to a particular phone number of the second communication device;
analyzing via the application at least one of audio of the phone communication as the phone communication is ongoing or a text transcription of the ongoing phone communication to determine a suspected fraudulent intent;
providing via the application a notification indicating a potential fraud to a user through the first communication device during the phone communication as the phone communication is ongoing based on the suspected fraudulent intent;
interrupting via the application the ongoing phone communication based on the suspected fraudulent intent determined during the ongoing phone communication by a process comprising disabling audio of the ongoing phone communication; and re-enabling the phone communication responsive to an input by the user via the first communication device.

16. The method of claim 14, wherein analyzing the phone communication comprises determining the existence of at least one of a particular word, a particular phrase, or a particular topic in the phone communication.

17. A method of providing an alert to a communication device user, the method comprising:

providing an application on a plurality of communication devices enabling monitoring of voice communications on the plurality of communication devices;

detecting via the application incoming voice communications on the plurality of communication devices between the plurality of communication devices and a particular communication device, the particular communication device corresponding to a particular phone number;

receiving by a computing system an indication of the particular phone number from the plurality of communication devices, the particular phone number corresponding to voice communications flagged by users of the plurality of communication devices via an actuatable flagging mechanism enabled by the application;

determining by the computing system that the indications of the particular phone number exceed a particular threshold;

determining that the particular phone number corresponds to a particular voice communication in progress on a certain communication device;

analyzing at least one of audio of the particular voice communication in progress or a text transcription of the particular voice communication in progress to determine a suspected fraudulent intent;

providing an indication of an alert indicating a potential fraud to a user of the certain communication device during the particular voice communication while the particular voice communication is in progress based on the determination that the particular phone number corresponds to the particular voice communication;

interrupting the particular voice communication by a process comprising disabling audio of the particular voice communication while the particular voice communication is in progress via the application on the certain communication device based on the determination that the particular phone number corresponds to the particular voice communication and based on the suspected fraudulent intent during the particular voice communication in progress; and re-enabling the particular voice communication responsive to a user input via the certain communication device.

18. The method of claim 17, further comprising transmitting an indication of an alert regarding the particular voice communication to a third party.

19. The method of claim 18, further comprising:

receiving by the computing system from the certain communication device at least one of a recording of the audio of the particular voice communication or a transcription of the audio of the particular voice communication; and transmitting from the computing system to the third party the at least one of the recording of the audio of the particular voice communication or the transcription of the audio of the particular voice communication.

20. The method of claim 17, wherein providing the indication of the alert comprises providing an indication of a likelihood that the particular voice communication is fraudulent to the user of the certain communication device.

21. A computing system comprising at least one non-transitory computer readable storage medium having encoded thereon instructions that, when executed by one or more processors of the system, cause the system to perform a process including:

providing an application on a first communication device enabling monitoring of phone communications on the first communication device;

detecting via the application an incoming phone communication on the first communication device between the first communication device and a second communication device, the phone communication corresponding to a particular phone number of the second communication device;

using a processor to compare the particular phone number to at least one list of phone numbers;

analyzing at least one of audio of the phone communication as the phone communication is ongoing or a text transcription of the ongoing phone communication to determine a suspected fraudulent intent;

providing via the application an alert indicating a potential fraud during the phone communication as the phone communication is ongoing to a user through the first communication device based on the comparison of the particular phone number to the at least one list and based on the suspected fraudulent intent during the ongoing phone communication;

interrupting the ongoing phone communication by a process comprising disabling audio of the ongoing phone communication via the application based on the comparison of the particular phone number to the at least one list and responsive to determining that the ongoing phone communication corresponds to the suspected fraudulent intent; and re-enabling the phone communication responsive to a user input by the user via the first communication device.

22. A computer network comprising a first communication device corresponding to a first user, the first communication device configured for:

detecting an incoming phone communication on the first communication device, the phone communication between the first communication device and a second communication device;

transmitting via a network data corresponding to the phone communication dining the phone communication;

interrupting the phone communication as the phone communication is ongoing by a process comprising disabling audio of the ongoing phone communication based on a potential fraud by a caller using the second communication device; and re-enabling the ongoing phone communication responsive to a user input by a user via the first communication device;

a computing system configured for:

receiving the data corresponding to the phone communication during the phone communication;

using a processor to analyze the data corresponding to the phone communication during the ongoing phone communication to determine the potential fraud by the caller using the second communication device; and providing an alert indicating the potential fraud to the user through the first communication device based on the analysis of the data corresponding to the phone communication.

23. The computer network of claim 22, wherein:
transmitting the data comprises transmitting by the first communication device a particular phone number corresponding to an incoming call from the second communication device to the first communication device; and
analyzing the data comprises comparing the particular phone number to a list of phone numbers to determine the potential fraud.

24. The computer network of claim 22, wherein:
the first communication device is further configured for recording the phone communication;
transmitting the data comprises transmitting by the first communication device at least one of the recording or a transcription of the phone communication; and
analyzing the data comprises analyzing the at least one of the recording or the transcription to determine the potential fraud by the caller using the second communication device.

25. A method of providing an alert to a communication device user, the method comprising:
providing an application on a plurality of communication devices enabling monitoring of phone communications on the plurality of communication devices;
detecting via the application incoming phone communications on the plurality of communication devices between the plurality of communication devices and a particular communication device, the particular communication device corresponding to a particular phone number;
using a processor to compare the particular phone number to at least one list of phone numbers;
analyzing at least one of audio of the phone communications as the phone communications are ongoing or a text transcription of the ongoing phone communications to determine a suspected fraudulent intent;
providing, in a user interface via the application, alerts during the phone communications to a plurality, of users through the plurality of communication devices based on the comparison of the particular phone number to the at least one list and based on the suspected fraudulent intent during the ongoing phone communications, the alerts comprising an indication of a fraud risk corresponding to the particular phone number and an actuatable flagging mechanism, and the alerts provided during the phone communications as the phone communications are ongoing to the plurality of users;
receiving via user actuation of the flagging mechanism a plurality of fraud suggestions corresponding to the particular phone number from the plurality of users;
updating the at least one list based on the plurality of fraud suggestions;
providing via the application a certain alert indicating a potential fraud during a particular phone communication as the particular phone communication is ongoing to a certain user through a certain communication device based on the comparison of the particular phone number to the updated at least one list and responsive to determining that the ongoing particular phone communication corresponds to the suspected fraudulent intent;
interrupting the particular phone communication between the particular communication device and the certain communication device of the certain user while the particular phone communication is ongoing by a process comprising disabling audio of the particular phone communication via the application on the certain communication device based on the comparison of the particular phone number to the updated at least one list and responsive to determining that the ongoing particular phone communication corresponds to the suspected fraudulent intent; and
re-enabling the particular phone communication responsive to a user input by the certain user via the certain communication device.

26. The method of claim 1, further comprising supplanting the disabled audio from the ongoing communication with replacement audio.

* * * * *